United States Patent
Lukosz et al.

(10) Patent No.: US 10,031,511 B2
(45) Date of Patent: Jul. 24, 2018

(54) ARRANGEMENT AND METHOD FOR MONITORING A POSITION OF A HAND-HELD TOOL

(71) Applicant: Robert Bosch GmbH, Stuttgart (DE)

(72) Inventors: Harald Lukosz, Schorndorf (DE); Christoph Kauth, Lohr am Main (DE)

(73) Assignee: Robert Bosch Gmbh, Stuttgart (DE)

( * ) Notice: Subject to any disclaimer, the term of this patent is extended or adjusted under 35 U.S.C. 154(b) by 373 days.

(21) Appl. No.: 14/827,389

(22) Filed: Aug. 17, 2015

(65) Prior Publication Data

US 2016/0048122 A1    Feb. 18, 2016

(30) Foreign Application Priority Data

Aug. 18, 2014  (DE) .................... 10 2014 216 331
Sep. 3, 2014  (DE) .................... 10 2014 217 568

(51) Int. Cl.
*G06F 19/00* (2018.01)
*G05B 19/4065* (2006.01)
*G05B 19/418* (2006.01)

(52) U.S. Cl.
CPC ..... *G05B 19/4065* (2013.01); *G05B 19/4183* (2013.01); *G05B 2219/31027* (2013.01); *G05B 2219/31432* (2013.01); *G05B 2219/31466* (2013.01); *G05B 2219/37404* (2013.01); *Y02P 90/04* (2015.11); *Y02P 90/10* (2015.11)

(58) Field of Classification Search
CPC ...... G05B 19/4065; G05B 2219/31432; G05B 2219/37404; G05B 19/4183; G05B 2219/31027; G05B 2219/31466; Y02P 90/04; Y02P 90/10
See application file for complete search history.

(56) References Cited

U.S. PATENT DOCUMENTS

| | | | | |
|---|---|---|---|---|
| 7,928,845 B1* | 4/2011 | LaRosa | ............ | G08B 13/1427 340/539.21 |
| 2010/0123892 A1* | 5/2010 | Miller | ............... | G01C 15/002 356/4.01 |
| 2011/0093110 A1* | 4/2011 | Stencel | .................. | B25B 21/00 700/110 |
| 2012/0136475 A1* | 5/2012 | Kahle | ................. | G01S 5/0221 700/182 |
| 2013/0096873 A1* | 4/2013 | Rosengaus | ......... | G01C 15/002 702/151 |
| 2014/0005807 A1* | 1/2014 | Busschaert | .......... | G05B 19/02 700/83 |
| 2014/0267685 A1* | 9/2014 | Kahle | ................... | B23Q 17/24 348/95 |
| 2015/0094836 A1* | 4/2015 | Rivers | ............... | G05B 19/4093 700/97 |

* cited by examiner

*Primary Examiner* — Thomas Lee
*Assistant Examiner* — Zhipeng Wang
(74) *Attorney, Agent, or Firm* — Maginot, Moore & Beck LLP

(57) ABSTRACT

The disclosure relates to an arrangement for monitoring a position of a hand-held tool within a work region, comprising the hand-held tool for use within the work region; means that are designed to generate a virtual image of the work region; means that are designed to determine an actual position of the hand-held tool within the image; the hand-held tool having display means that are designed to display the actual position, and to a method for monitoring a position of a hand-held tool.

16 Claims, 3 Drawing Sheets

ARRANGEMENT AND METHOD FOR MONITORING A POSITION OF A HAND-HELD TOOL

This application claims priority under 35 U.S.C. § 119 to application no. DE 10 2014 216 331.5, filed on Aug. 18, 2014 in Germany, and to application no. DE 10 2014 217 568.2, filed on Sep. 3, 2014 in Germany, the disclosures of which are incorporated herein by reference in its entirety.

BACKGROUND

The present disclosure relates to an arrangement and a method for monitoring a hand-held tool within a work region.

Usually, in industrial assembly tasks, hand-held tools are used that can be manipulated in a simple and flexible manner. For this purpose, such hand-held tools can be picked up by a user, and used and set down again. Such hand-held tool are, for example, in the following having the abbreviated, or short form, battery-operated screwdrivers, riveting appliances, stamping appliances and the like, as are required in corresponding assembly tasks.

In this case, for a certain process reliability, integrated controllers and sensors may be provided in the hand-held tool, by which the work to be performed, for example the tightening of a screw, is monitored or even performed automatically. In this case, for example, a special torque may be specified.

A further point in respect of the process reliability in this case is that the hand-held tool must also always be able to be found by the user, at the location provided for it. For this purpose, the hand-held tool may be fastened, for example by means of a pull rope, although the ease of handling and the action radius may sometimes be significantly limited as a result.

It is therefore desirable to further increase the process reliability in the use of hand-held tools.

SUMMARY

The disclosure proposes an arrangement, a hand-held tool and a method having the features disclosed herein. Advantageous designs are also provided by the following description.

An arrangement according to the disclosure is used to monitor a position of a hand-held tool within a work region. For this purpose, the arrangement comprises the hand-held tool for use within the work region, means that are designed to generate a virtual image of the work region, and means that are designed to determine an actual position of the hand-held tool within the image. The hand-held tool in this case has display means that are designed to display the actual position.

Determination of actual position in this case may be based, in particular, on principles of interior location. The display means may comprise, for example, a display and a corresponding control, by which the virtual image and the actual position are displayed, within the image, on the display. The virtual image may comprise, for example, only a floor area of the work region, as a two-dimensional representation, or also, alternatively, a spatial representation, as a three-dimensional representation. For each point in space in the virtual image, items of information that are specific to the point in space can be provided, for example, by means of a database, including instructions, specific to a point in space, to a user of the hand-held tool, specified conditions, specific to a point in space, for the work process to be executed by means of the hand-held tool, such as permissible illumination, speed, or position of the tool at the current spatial position, and the like.

The above-mentioned means that are designed to sense the actual conditions, such as actual position, actual speed or actual acceleration, may comprise, for example, transmitting and/or receiving means, by means of which it is possible to measure actual field strength, in particular also combined with direction recognition, for example by use of a digital compass. In particular, the measured actual field strength may be coordinated with individual items of field-strength information assigned to the points in space of the work region. These items of field-strength information are stored in a database, in particular together with further conditions such as, for example, position specifications. The database may be stored in the hand-held tool, or realized such that it can be accessed and fetched by the hand-held tool (e.g. via a network connection). The position data that is obtainable in this way from the database information can then be used for determining the actual position in dependence on the measured field strength, and in particular also for navigating the user of the hand-held tool within the work region. It is assumed in this case that a certain field strength can be assigned to each point in space, with a tolerance range being taken into account. Therefore, conversely, the point in space can also be determined from the field strength. If this principle is extended to take account of a plurality of transmitting means and if, on the basis of the signals received from the transmitting means, the respective positions assigned to the signals are determined in the hand-held tool, then, by means of overlaying of the determined position data, internal coordination of the thus determined position data can be effected in the hand-held tool, and the accuracy can be increased, or a tolerance range can be determined Transmitting means may be, for example, Bluetooth beacons, WLAN access points and the like.

The user of the hand-held tool thus obtains information, directly on the display of the user's hand-held tool, concerning the user's current position, and he can thus check very rapidly, for example, whether he is currently in the correct position for the work step that is currently to be performed. Furthermore, the current position of the hand-held tool can be transmitted to, for example, a higher-order controller, and be used for locating the hand-held tool. Both the working speed and the process reliability are thereby increased. The user can additionally obtain position-dependent instructions or indications from a higher-order item of equipment that receives and evaluates the position of the hand-held tool. If the indications relate to the work process, this information can also be stored within the hand-held tool, for example together with a control program, implemented for the hand-held tool, that can also be processed a hand-held tool control means comprised by the hand-held tool.

Advantageously, the arrangement furthermore comprises means that are designed to determine a start position of the hand-held tool within the image (virtual location), the means that are designed to determine the actual position preferably also comprising means for recognizing direction, starting from the start position.

The start position in this case can be determined, for example, in that a user goes to a defined point in the (real) work region and actuates a pushbutton on the hand-held tool. The hand-held tool then assigns the real location to a predefined location, that is identical in the virtual image, it being assumed that the current location, at the instant at which the pushbutton is actuated, or at which another, corresponding action is performed, is substantially identical to the virtual location.

However, a user may also, for example, scan-in a code (bar code, matrix code, etc.) in the (real) work region, at a defined place. The code in this case comprises a reference to data of a virtual image, and coordinates of the current position. By means of this information, the database of the virtual image is loaded into the hand-held tool (for example, from an external database), or is selected (from an internal database) and the starting point in the virtual image is defined by the coordinates. For this purpose, the hand-held tool comprises an additional appropriate code scanner, or may be connected to such a scanner.

Alternatively, the user may also capture a distinctive, real point in space by means of an image acquisition means additionally comprised by the hand-held tool, such as, for example, a CCD camera. By means of an image recognition means that is additionally comprised by the hand-held tool, a database, assigned to the recognized distinctive point, is determined and loaded. The starting point in the virtual image is then defined by the distinctive point in space that is also present in the virtual image. The coordinates of this point in space are preferably likewise a constituent part of the database. The hand-held tool either comprises the camera or may be connected to a camera. The advantage of this solution is that no additional markings need be applied in the space, but instead the space as such can be recognized automatically if there are suitable distinctive points in space present.

Depending on the conditions that exist, i.e. whether, for example, there are corresponding transmitting and/or receiving devices present with the work region, whether or not there are markings present, the respectively desired variant of the determination of actual position can be selected by a user of the hand-held tool. Advantageously, for this purpose the hand-held tool supports all previously known variants, and keeps these available for selection as part of a selection menu for the user.

Also particularly advantageous is a combination of a plurality of possibilities for determination of actual position. This enables either a more precise determination of position to be effected, insofar as a plurality of the possibilities can be used simultaneously, or, alternatively, the corresponding hand-held tool can be used universally in differing work regions, which each allow only one of the possibilities for determination of actual position.

The determination of position, starting from the now known start position, may be realized, for example, in that a location is determined by means of evaluation of direction of motion, speed and/or time, for example by means of acceleration sensors, e.g. 3-axis acceleration sensors, gyro sensors, and with the use of a correspondingly designed evaluation algorithm. The evaluation algorithm determines, for example on the basis of the signals of the accelerations sensors, the path traversed and/or the position in the space, by multiple integration of the obtained sensor signals. Intermediate results, such as the speed of the motion, may likewise be processed. The determination of position, starting from the now known start position, may also be performed, alternatively or in combination, on the basis of a step count, preferably in combination with a direction recognition in the form of digital compass. The step count and/or direction recognition may be based on mechanical methods, such as mechanical contacts, or on electronic methods in combination with appropriate sensors, such as acceleration sensors, Hall sensors and the like. In the case of the step count, additional user information, such as the length of the user's step, is stored in a user database that is accessible to the hand-held tool. From the length of step, the number of steps and the use of defined time windows, the aforementioned algorithm can determine speed, path traversed and the acceleration, by means of the known relationships between these variables. Alternatively or additionally, the hand-held tool could also comprise means for radar-based measurement of speed and/or path, which means is realized, for example, by means of a radar sensor system, and the signals of which are used by means of the aforementioned algorithm for measuring speed and/or path.

Preferably, the arrangement comprises means that are designed to specify a specified motion path of the hand-held tool and/or to determine an actual motion path of the hand-held tool. In particular, the arrangement additionally comprises means that are designed to determine the actual position, taking account of the specified motion path and/or deviations of the actual position from the specified motion path. The specified motion path in this case is defined, in particular, by the start position, or by another initial position, and by one or more target positions. The motion path could also be predefined, for example, by means of a setpoint generator.

Predefinition of the specified motion path, and/or determination of the actual motion path, in particular also automatic determination of the motion path, may be effected in this case on the basis of items of output information (e.g. assembly instructions/parts list, etc. for assembly tasks to be performed on a particular object) that can be predefined manually or by means of a database. The user can thus be informed, in a very simple and rapid manner, concerning the path that he has to traverse with the hand-held tool and, in particular, also concerning whether, or the fact that, he is located on an incorrect path.

It is advantageous if the arrangement comprises means that are designed to generate a user guidance and/or a user instruction, based on the actual position, for display on the display means. For example, in the case of assembly, the user obtains position-dependent instructions in respect of the path that he is to traverse, or tasks that he is to perform, by means of a display comprised by the hand-held tool. For this purpose, for example in respect of the individual points in space, indications for the user that are assigned to references to the points in space are stored in the hand-held tool or in a database that is accessible to the hand-held tool by means of a network connection. The user can thus be informed concerning which work steps he must perform at which position. This increases the process reliability yet further.

It is furthermore advantageous if the arrangement comprises means that are designed to generate protection against theft. For this purpose, for example, an alarm function may be triggered on the hand-held tool itself, or via a network connection of the hand-held tool, and/or the entire hand-held tool or individual functions of the hand-held tool may be blocked if the hand-held tool is located outside of the work region. This also, on the one hand, increases the process reliability, since it is ensured that the hand-held tool remains in the work region. On the other hand, possible theft is prevented.

A hand-held tool according to the disclosure serves for use in an arrangement according to the disclosure. In this case, the hand-held tool has display means for displaying an actual position of the hand-held tool within a virtual image of a work region. In particular, the hand-held tool in this case comprises at least one of the means of an arrangement according to the disclosure, preferably all means. For example, the hand-held tool is connected by means of radio (WLAN) to a higher-order controller for the exchange of data in respect of digital spatial plans, position-dependent status information, position-dependent messages to the user, and the like. Such a hand-held tool in this case has the advantages already mentioned above.

Preferably, the hand-held tool is realized as a screwdriver, as a riveting tool or as a stamping appliance. These are types of hand-held tools used in industrial assembly tasks. Also conceivable, however, are other type of hand-held power tool that can be designed according to the disclosure.

The hand-held tool in this case comprises, in particular, an integrated controller and sensors, in particular including acceleration sensors. These sensors may have a double function in this case, namely, in addition to the inclusion of the sensor signals for monitoring, for example, the screwdriving or riveting process, also use for the interior navigation according to the disclosure.

A method according to the disclosure is used for monitoring, within a work region, a position of a hand-held tool, which is provided for use within the work region. In this case, a virtual image of the work region is generated, an actual position of the hand-held tool within the image is determined, and the actual position is displayed on a display means of the hand-held tool.

Preferably, in the case of the method, steps to be performed are performed by the means of an arrangement according to the disclosure. It is understood that the preferred designs mentioned concerning the arrangement according to the disclosure are each also applicable in the case of a method according to the disclosure. Concerning the advantages of a method according to the disclosure, to avoid repetition reference is to be made to the statements mentioned above.

A computing unit according to the disclosure, e.g. a higher-order control unit in a work region, is designed, in particular in respect of programming, to implement a method according to the disclosure.

The implementation of the disclosure in the form of software is also advantageous, since this provides for particularly low costs, in particular if an executing computing unit is also used for other tasks and is therefore present in any case. Suitable data carriers for providing the computer program are, in particular, diskettes, hard disks, flash memories, EEPROMs, CD-ROMs, DVDs, etc. Downloading a program via computer networks (Internet, intranet, etc.) is also possible.

Further advantages and designs of the disclosure are disclosed by the description and the accompanying drawing.

It is understood that the above-mentioned features and those yet to be explained in the following may be applied, not only in the respectively specified combination, but also in other combinations or singly, without departure from the scope of the present disclosure.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
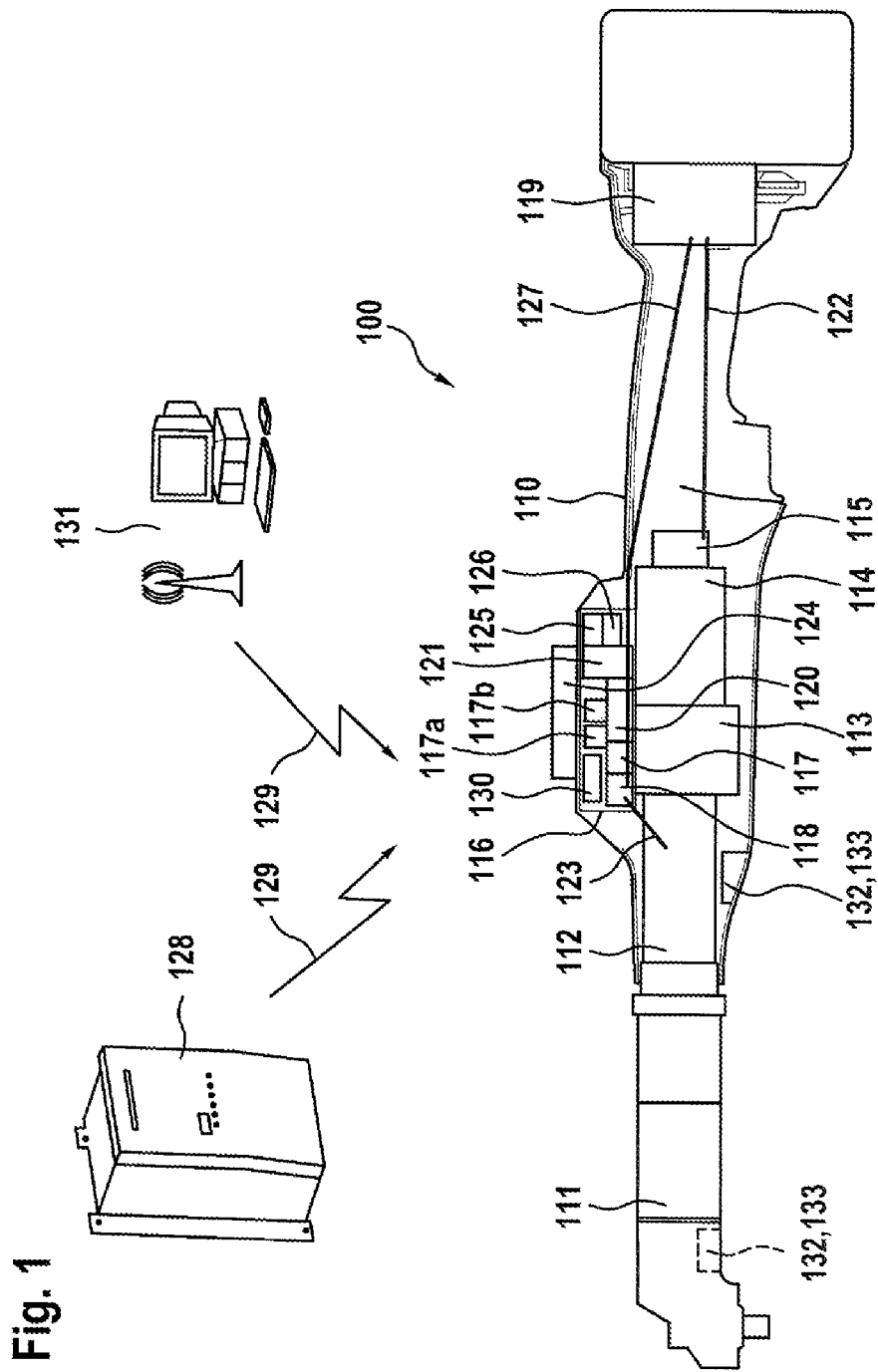
FIG. 1 shows, schematically, a hand-held tool according to the disclosure, in a first preferred design.

Represented in FIG. 1 is a hand-held tool 100, as an offset screwdriver (centre-grip screwdriver also conceivable), which is used—as a hand-held screwdriver or as a stationary screwdriving spindle—to perform screwdriving tasks, and which comprises a housing 110. The housing 110, in turn, comprises at least one output 111, a transmission 113 and a motor 114, and preferably also a torque transducer 112 and a rotor-position encoder 115.

The output 111 can be driven by means of the motor 114 and by use of the transmission 113. The housing 110 of the screwdriver 110 comprises an integrated screwdriving-process control means 116 for executing a screwdriving process that is completely closed per se. The screwdriver is at least temporarily autonomous and, by means of the internal control means 116, can be operated independently of a higher-order screwdriving process controller 131.

The screwdriver 100 can communicate with the higher-order screwdriving process controller 131, or also with other items of equipment 128, by radio link 129 (e.g. access-point/router), and can exchange data with these items of equipment 131, 128 (screwdriving program, result data and the like). The screwdriving-process control means 116 comprises, as components, at least one microprocessor 117, having a memory 117a, or a memory receiving device 117b, and preferably, in addition, a measuring module 118 and a servo amplifier 119.

The screwdriving-process control means 116 may additionally be used as means for generating a virtual image of the work region. In cooperation with, for example, the radio links 129, or the items of equipment 131, 128 downstream from them, the actual position of the screwdriver 100 can be determined in the virtual image. Preferably, however, all the means comprised by the disclosed arrangement are comprised by the hand-held tool and realized by means of the screwdriving-process control means 116 or by an additional computing unit comprised by the hand-held tool. The hand-held tool thus additionally comprises the function of an interior navigation that is preferably based exclusively on the sensors and electronics comprised by the hand-held tool, such as acceleration sensors, a step counter and/or an electronic compass, and possibly based on an algorithm running, preferably in real time, on the screwdriving-process control means 116, for evaluating the sensors and determining the actual position.

The input of the measuring module 118 is connected in a data-transmitting manner, by means of a connection 123, to the output of the torque transducer 112. The connection 123 in this case is, for example, a data bus, or a corresponding serial data connection is also conceivable. The servo amplifier 119 is connected to the rotor-position encoder 115 by means of a connection 122 (for example, likewise in the form of a data bus or a serial data connection), and to the measuring module 118 by means of a further, separate connection 127. The connection 127 is a data bus that provides for cross-communication between the components 117, 118, 119, 120.

The motor 114 may be controlled by means of a screwdriving program that can be executed by means of the microprocessor 117, the rotor position and the output data of the torque transducer 112 being taken into account. The microprocessor 117 reads the screwdriving program out of the memory 117a or out of a flash-memory card inserted in the memory receiving device 117b.

Input/output units 120, as further comprised components, realize a human-machine interface (e.g. between screwdriver and operator, by keypad and display) and/or a machine-machine interface (e.g. between screwdriver and PC, by data interfaces), preferably with visualization of data relevant to the screwdriving process (e.g. by means of a color display 124) for the operator.

The color display 124 in this case may be used as display means according to the disclosure, or at least as a part thereof. For example, the color display 124, acting in combination with the screwdriving-process control means 116, may represent the virtual image of the work region and the actual position of the screwdriver 100 in the virtual image.

Arranged close to the output 111, or directly on the output 111, there is an optional image acquisition means 132, or an arrangement 133 for mechanically or electrically connecting an aforementioned image acquisition means 132 is provided. The screwdriving-process control means 116 may also simultaneously perform the function of image processing/ image analysis 130.

This radio-communication battery-powered screwdriver comprises all necessary details for realizing safety-critical screw joints, such as result storage, result output and result documentation. An integrated transmitter 121 transmits the screw-joint data by radio link 129 to a receiving station 128, 131, for example by use of an access point. In the event of the occurrence of a short-term radio-communication dead spot, the integrated electronics store the data in the screwdriver and forward them once a radio connection 129 is again present.

The transmitter 121 may also be used as part of the means for determining the actual position, in that the position is determined by acting in combination with the receiving stations 128, 131.

The fully integrated control and power electronics virtually dispenses with the former division of such arrangements into a plurality of components connected via power and communication cables, and ensures 100% documentation of all operations, thereby providing for a high degree of availability and contributing significantly to process reliability.

A color display 124 is provided on the screwdrivers 100, for parameterization and worker information. As already mentioned above, the color display 124 may also be used as a display means according to the disclosure, for displaying the actual position and the associated virtual image of the work region. In addition, actual and/or specified motion paths, which are determined, or specified, for example, b means of the screwdriving-process control means 116, may also be displayed on the color display. Likewise, it is possible for position-dependent operating instructions to be displayed to a user of the hand-held tool.

An integrated high-intensity LED also provides for optimum illumination of the screwdriving location at all times, even in changing light conditions. The colored background of the display (e.g. red/green) indicates the result of the screw connection that has just been produced by the spindle. By means of the screwdriver, torques of up to 50 Nm are achieved, and lithium-ion batteries provide for reliable operation.

Image information and/or ancillary image information, generated by the image acquisition means 132, 133 and/or by the screwdriving-process control means 116 and/or by a higher-order item of equipment 128, 131, such as, for example, text instructions/image instructions to the tool operator, may also be overlaid on the display 124. Audio devices (microphone input, loudspeaker output, or microphone or loudspeaker) 126 and/or a Bluetooth module 125 for audio data transmission, provide possibilities for acoustically connecting the operator to a higher-order item of equipment 128, 131. Moreover, the Bluetooth module 125 may also be used for determining the actual position, it that it functions as a receiving means for a Bluetooth transmitting means arranged in the space, the field strength of which is determined automatically by the hand-held tool for the purpose of determining position. For this purpose, it is recommended to define a circle, as an action radius of the user of the hand-held tool within a work space, with the Bluetooth transmitting means being located in the centre of the circle. The Bluetooth transmitting means would have to be mounted in the space, e.g. on the floor, ceiling, or similar. BLE (Bluetooth Low Energy) is recommended, because of the low energy consumption. The Bluetooth transmitting means could be supplied by means of solar cells, and use the interior lighting as an energy source. Correspondingly suitable and sensitive solar cells are commercially available. The concept of the Bluetooth transmitting means is also applicable to WLAN access points in combination with field-strength measurements for determining the position of the appliance. WLAN is increasingly being introduced in industry, and the infrastructure would then be present in any case. Depending on the arrangement of the transmitting means, differing work space configurations can be formed. The computing intelligence present in the hand-held tool is designed to determine, from the field strength measurements of one or more transmitting means, the actual position within the virtual and the real work space.

All variants of the determination of actual position that have been mentioned here could be combined with a GPS evaluation by GPS, in that, where there is an existing GPS signal, this is used in an ancillary manner or exclusively. For this, a GPS receiver would have to be integrated into the hand-held tool, the GPS signal strength being monitored permanently, and the actual position being determined and/ or verified with or without GPS, depending on the signal strength.

Moreover, the principle according to the disclosure may be used to realize protection against theft. For this purpose, for example, one or more, in particular all, functions of the screwdriver 100 can be blocked as soon as it is identified that the actual position is located outside of the work region, or outside of another defined region.

Figure 2:
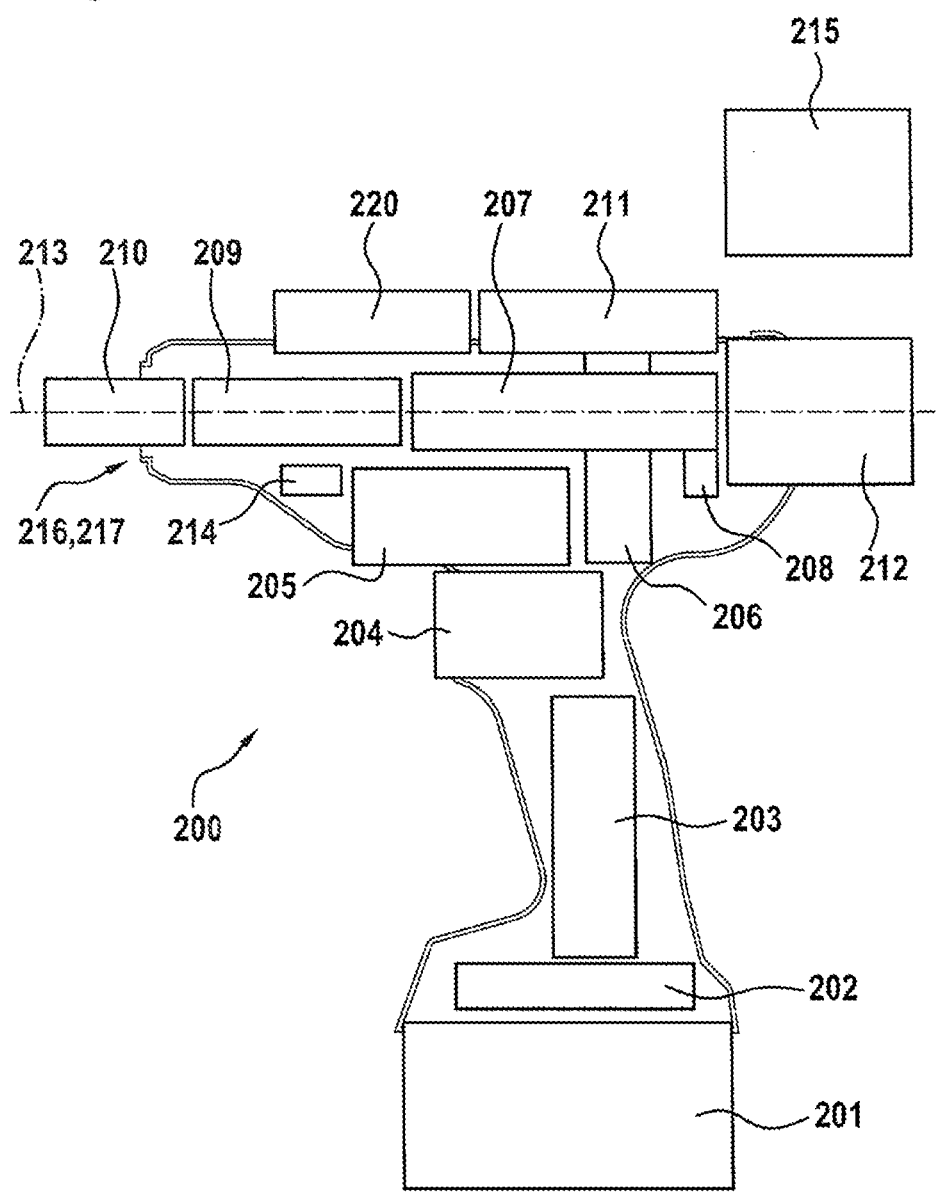
FIG. 2 shows, schematically, a hand-held tool according to the disclosure, in a second preferred design.

Represented in FIG. 2 is a hand-held tool 200, realized as a rivet setter, or riveting tool, that is used to perform pressing-in tasks. It can be used to set blind rivets, consisting of a rivet body and a rivet mandrel, or blind nuts. This is a battery-operated appliance for manual operation. Apart from the functional and mechanical differences, all appliance functions relating to the disclosure mentioned in connection with FIG. 1 are also realized, or realizable, in the riveting tool. Here, likewise, the appliance has internal control electronics that, inter alia, control the riveting process, and if necessary execute the riveting process entirely autonomously, and that are designed to execute the steps necessary for realizing the interior navigation according to the disclosure, automatically and/or by use of a higher-order computing means.

An appliance head 210 is provided, having a mouth piece for holding the rivet mandrel. Arranged along the same axis 213, adjoining each other, are the appliance head 210 and/or a force sensor having a rivet-mandrel feed-through 209, and/or a trapezoidal or recirculating ball spindle 207 having a rivet-mandrel feed-through, and/or, preferably, a rivet-mandrel container 212. The rivet mandrel held by the mouth piece during the assembly operation, after it has been pulled off, can thus be guided through, as far as the rivet-mandrel container 212, by the aforementioned components 210, 209, 207.

The trapezoidal or recirculating ball spindle 207 is driven by means of an electric motor 205, preferably in combination with a transmission 206, possibly with an offset. Arranged on the trapezoidal or recirculating ball spindle 207 is a displacement sensor 208 that, by means of the rotational angle travelled by the trapezoidal or recirculating ball spindle 207, can directly or indirectly sense the displacement of the trapezoidal or recirculating ball spindle 207. Alternatively, the displacement sensor 208 could also be arranged on the motor 205.

Reference 211 denotes control electronics, having a communication module, and reference 220 denotes a display, of which both, or also one, may also be comprised, at least partially, by the housing. The rivet-mandrel container 212 may also be comprises, at least partially by the housing. The entire aforementioned arrangement is supplied with electricity by means of a battery 201, for which purpose a wiring harness 203 is provided. The start switch 204 is used for switching on and off.

Reference 202 denotes the interface to power electronics for controlling the motor 205. At least the components 202, 203, 205, 206, 207, 208, 209 and completely encompassed by the housing of the rivet setter, and preferably also the component 211. The control electronics 211 are provided with a data memory, and are connected to the sensors 208, 209 in such a manner that the control electronics can store in the data memory and/or evaluate the quantity of data supplied continuously by the sensors during a setting operation.

Preferably, the rivet setter comprises a radio module 214, preferably a WLAN module and/or a mobile telephony module (GSM/G3/G4) for wirelessly transmitting process data or stored data to a higher-order controller 215. The two modules could also be activated in an alternating manner, for example in dependence on the signal quality and the connection to data networks.

Process data are understood to mean continuous data streams that are generated by means of the force and displacement sensors during the operation of setting blind rivets or blind-rivet nuts, and that therefore represent characteristic data for a specific setting operation, and that can be used, inter alia, for quality analysis (force-displacement data). Such a quality analysis may be performed, with the use of reference data sets (force-displacement data), either by means of the internal control electronics 211 and/or by means of a higher-order item of equipment 215.

The same applies to the image processing and the associated image data. Thus, in the display 220, besides pure OK/NOK information (NOK=not OK) information, force-displacement curves or analysis results relating thereto may be displayed to the user. A higher-order item of equipment 215 uses an external display for this purpose. Such analyses then make it possible to evaluate the force-displacement diagrams of each individual rivet joint that has been realized within a production line.

The appliance head 210 comprises an image acquisition means 216, or an arrangement 217 is provided for mechanically or electrically connecting an aforementioned image acquisition means 216 to the rivet setter. The control electronics 211 simultaneously performs the function of image processing/image analysis, or alternatively this is effected by the higher-order item of equipment 215, which communicates by radio with the rivet setter.

The control electronics 211 may additionally be used as means for generating a virtual image of the work region. The actual position of the riveting tool 200 can be determined in the virtual image, on the basis of the methods previously explained in the description, such as, for example, spatial point recognition by means of image recognition, or by means of a scanned-in code, either autonomously or in cooperation with, for example, the radio module 214, or the higher-order item of equipment 215 downstream from it.

The display 220 in this case may be used as display means according to the disclosure, or at least as a part thereof. For example, the display 220, acting in combination with the control electronics 211, may represent the virtual image of the work region and the actual position of the riveting tool 200 in the virtual image.

The method according to the disclosure may additionally be used, as already explained in connection with FIG. 1, to realize protection against theft. For this purpose, for example, one or more, in particular all, functions of the riveting tool can be blocked as soon as it is identified that the actual position is located outside of the work region, or outside of another defined region.

The statements relating to FIGS. 1 and 2 are also applicable to other intelligent hand-held tools, for example stamping tools, and generally to tools having an integrated controller for automatically performing, monitoring and/or logging industrial processes. The principle according to the disclosure is identical in all of these appliances. Differences arise only in the mechanical structure of the appliances and in their fields of application, or function. In general, they are appliances for machining workpieces, or for performing work on a workpiece.

Figure 3:
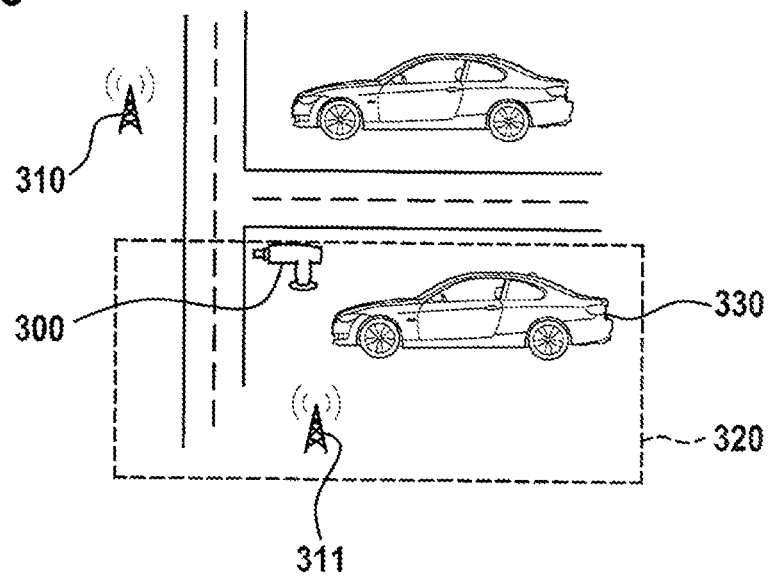
FIG. 3 shows, schematically, an industrial production facility, having a work region for which the arrangement according to the disclosure may be applied.

A portion of an industrial production facility, based on the example of automobile production, is represented schematically in FIG. 3. In this case, exemplarily, a work region 320 comprises an automobile 330. There is a hand-held tool 300 present in the work region 320. The hand-held tool 300 may be, for example, one of the above-mentioned hand-held tools 100 or 200, or a stamping appliance. Hand-held welding tongs, for realizing weld spots or weld seam on body shells, would also be conceivable. These appliances would then have to be equipped with a display and a computing means, as well as the sensors and items of equipment required for realizing the means according to the disclosure. Also represented exemplarily are two radio transmission means 310, 311, to which the hand-held tool is connected, or with which it can communicate.

Figure 4:
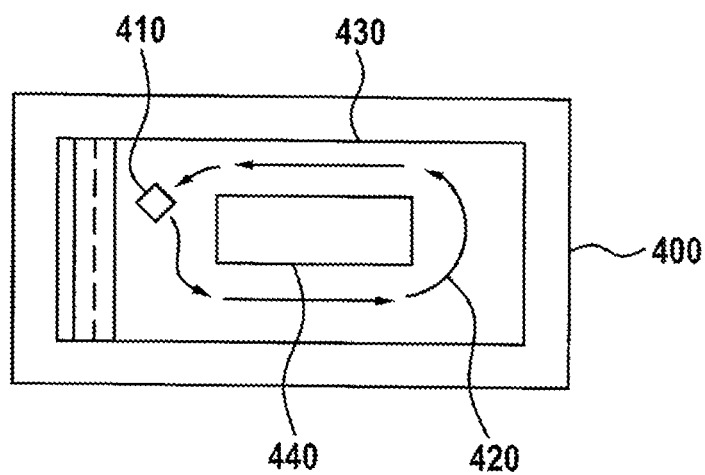
FIG. 4 shows, schematically, a display means of a hand-held tool according to the disclosure, having a representation of a virtual image of a work region.

Represented schematically in FIG. 4 is a display 400, as part of a display means of a hand-held tool. This display may be, for example, one of the above-mentioned displays 124 or 220. Represented on the display 400 is a virtual image 430 of the work region 320. The display 430 may be obtained, for example, from stored layout plans or the like.

Additionally represented on the display 400, within the virtual image 430, is a current actual position 410 of the hand-held tool 300. This current actual position is obtained, for example, by means of the two radio transmission means 310, 311, which are connected to the hand-held tool 300. The more there are such radio transmission means present, the more precisely can the current actual position be determined and represented.

Additionally shown in the virtual image 430, exemplarily, is a specified motion path 420, which leads around the virtual representation 440 of the automobile 330 and indicates various stop points. A user of the hand-held tool 300 can thus see precisely which stop points are provided for machining with the hand-held tool 300 in the work region 320.

Furthermore, the user can also see whether he is possibly deviating from the predefined specified motion path 420, namely, if the actual position 410 is no longer located on the predefined specified motion path 420. Depending on design, in such a case a pictorial, textual and/or acoustic warning may also be emitted. A particular advantage of the disclosure is that position-dependent instructions can be issued to the user, in the context of the work process to be performed by the user, visually on the display and, if appropriate, even acoustically, via a loudspeaker or microphone output.

By means of higher-order items of equipment, such as the items of equipment 128, 131, 215 shown in FIGS. 1 and 2, the work process performed by means of the hand-held tool 100, 200 by the user can be easily monitored on the basis of the indicated position of the user, provided by the hand-held tool 100, 200. For this purpose, the actual data of the user, or of the hand-held tool, are transmitted cyclically or iteratively to the higher-order items of equipment 128, 131, 215. The higher-order items of equipment 128, 131, 215 are therefore able to monitor the work process, or a plurality of work processes, preferably simultaneously, on the basis of corresponding specified data, and to document deviations from the specified process. Actual or specified data may relate to the position, speed, acceleration and data derived therefrom.

However, actual data may also be environment information, sensed by the hand-held tool by means of appropriate sensors such as, for example, a camera, or user information sensed by means of biometric data. This makes it possible, for example in the context of process monitoring, also to establish whether the correct user is present at the correct location and is executing the works relevant to the process in the prescribed manner.

What is claimed is:

1. An arrangement for monitoring a position of a hand-held tool within a work region, comprising:
   a hand-held tool used within the work region, the hand-held tool having a display device configured to display (i) a virtual image of the work region having an actual position of the handheld tool within the work region overlaid thereon and (ii) position-dependent user instructions for a work process to be executed;
   at least one sensor configured to provide sensor data; and
   at least one controller configured to:
      specify a specified motion path of the hand-held tool;
      determine an actual motion path of the hand-held tool based on the sensor data;
      determine the actual position of the hand-held tool within the work region based on deviations of the actual motion path from the specified motion path;
      generate the virtual image of the work region having the actual position of the hand-held tool overlaid thereon;
      generate the position-dependent user instructions based on the actual position of the hand-held tool; and
      provide the virtual image and the position-dependent user instruction to the display device of the hand-held tool.

2. The arrangement according to claim 1, wherein the at least one controller is configured to set a start position of the hand-held tool within the virtual image based on the actual position of the hand-held tool in response to an input indicating that the hand-held tool is at a predefined location.

3. The arrangement according to claim 1, further comprising:
   an alarm configured to activate in response to the hand-held tool being outside the work region.

4. The arrangement according to claim 1, wherein the at least one controller is configured to disable at least one function of the hand-held tool in response to the hand-held tool being outside the work region.

5. A hand-held tool for use in an arrangement having at least one sensor configured to provide sensor data, the hand-held tool comprising:
   a display device configured to display (i) a virtual image of the work region having an actual position of the hand-held tool within the work region overlaid thereon and (ii) position-dependent user instructions for a work process to be executed; and
   a controller operably connected to the display device, the controller configured to:
      specify a specified motion path of the hand-held tool;
      determine an actual motion path of the hand-held tool based on the sensor data;
      determine the actual position of the hand-held tool within the work region based on deviations of the actual motion path from the specified motion path;
      generate the virtual image of the work region having the actual position of the hand-held tool overlaid thereon;
      generate the position-dependent user instructions based on the actual position of the hand-held tool; and
      provide the virtual image and the position-dependent user instruction to the display device of the hand-held tool.

6. The hand-held tool according to claim 5, further comprising:
   a first sensor of the at least one sensor in the arrangement, the first sensor comprising an accelerometer.

7. The hand-held tool according to claim 5, wherein the hand-held tool is at least one of a screwdriver, a riveting tool, and a stamping appliance.

8. A method of monitoring a position of a hand-held tool used within a work region, the method comprising:
   generating, with a controller, a virtual image of the work region;
   specifying a specified motion path of the hand-held tool;
   determining an actual motion path of the hand-held tool based on sensor data from at least one sensor;
   determining, with the controller, an actual position of the hand-held tool within the work region based on deviations of the actual motion path from the specified motion path;
   generating, with the controller, position-dependent user instructions for a work process to be executed based on the actual position of the hand-held tool; and
   displaying, on a display device of the hand-held tool, (i) the virtual image with the actual position of the hand-held tool overlaid thereon and (ii) the position-dependent user instructions.

9. The method according to claim 8, wherein the hand-held tool includes the controller.

10. The method according to claim 8, wherein the method is implemented by a computing unit.

11. The method according to claim 10, wherein the computing unit is configured to execute a computer program to implement the method.

12. The method according to claim 11, wherein the computer program is stored on a non-transitory machine-readable storage medium operably connected to the computing unit.

13. The arrangement according to claim 2, wherein the input indicating that the hand-held tool is at the predefined location comprises a pushbutton on the hand-held tool being pressed.

14. The arrangement according to claim 2, wherein the input indicating that the hand-held tool is at the predefined location comprises a code being scanned at the predefined location by a scanner of the hand-held tool.

15. The arrangement according to claim 1, wherein the at least one sensor includes an accelerometer of the hand-held tool.

16. The arrangement according to claim 1, wherein the at least one sensor includes transmitter arranged a predefined location of the work region and a receiver of the hand-held tool configured to provide field-strength measurements of a signal transmitted from the transmitter.

* * * * *